US007387722B1

(12) United States Patent
Varner et al.

(10) Patent No.: US 7,387,722 B1
(45) Date of Patent: Jun. 17, 2008

(54) WATER TREATMENT SYSTEM

(76) Inventors: Robert G Varner, 1100 Fifth St., Ida Grove, IA (US) 51445-1548; Daniel G. Varner, 2623 S. Lyon St., Sioux City, IA (US) 51106-3912

( * ) Notice: Subject to any disclaimer, the term of this patent is extended or adjusted under 35 U.S.C. 154(b) by 400 days.

(21) Appl. No.: 11/041,334

(22) Filed: Jan. 24, 2005

Related U.S. Application Data

(60) Provisional application No. 60/541,328, filed on Feb. 3, 2004.

(51) Int. Cl.
*C02F 3/00* (2006.01)
(52) U.S. Cl. .......................... 210/97; 210/103; 210/109; 210/121; 210/123
(58) Field of Classification Search .................... 210/97, 210/103, 109, 121, 123
See application file for complete search history.

(56) References Cited

U.S. PATENT DOCUMENTS 6,818,126 B2 * 11/2004 Larson ........................ 210/171
2002/0017495 A1 * 2/2002 Iizuka et al. ................. 210/739

* cited by examiner

*Primary Examiner*—Chester T. Barry
(74) *Attorney, Agent, or Firm*—McKee, Voorhees & Sease, P.L.C.

(57) ABSTRACT

An automatic system for treating water, which consists of two treatment tanks adapted to be operated alternately. The tanks are interconnected with each other by a unique isolation valving system that permits one tank to be in use while the other is on standby. They are also connected to a single brine tank and alternate by being controlled with a novel, photo/electric water sensor, which reacts to a predetermined flow of water through the tanks. This system is very environmentally friendly by reducing the amount of water and salt used in the regeneration of the minerals compared with other systems operating today.

14 Claims, 4 Drawing Sheets

WATER TREATMENT SYSTEM

This application claims the benefit of U.S. Provisional Application No. 60/541,328 filed Feb. 3, 2004.

FIELD OF INVENTION

This invention is concerned with a system of treating water to remove the minerals contributing to it's contamination, such as: nitrates, calcium and iron, and any other minerals which react to the "ion exchange principal," commonly used in water treatment systems today. It uses a well known system of treatment, but is new in the automatic function and the interconnection and valving process of the system. It also uses a novel flow sensor to control the overall system.

BACKGROUND AND SUMMARY OF THE INVENTION

Hard water has been a plague and a nuisance for a long time. Nitrates in the water have been a health problem, especially for infants. By removing these contaminants, soaps and detergents perform better, and much less use of these products are necessary for proper cleaning. Also, by eliminating the calcium in the water, plumbing pipes, water heaters, etc. have a much longer life. When removing these dangerous nitrates, through the ion exchange system, the water becomes safe for human and animal consumption.

Certain devices have been invented to remove the undesired minerals from the water. The most common type of "water-treatment" device is an ion-exchange system, which is readily rechargeable. These devices operate principally by causing untreated water to flow through a bed of treated material. During that flow, the undesired cations in the water are removed and replaced by less objectionable materials. When the bed of material becomes charged with the undesirable ions, it is regenerated by a solution—usually brine—which can be passed through the bed of mineral. We use a reverse flow of the brine through the bed of materials, although a direct flow may be—and commonly is—used in systems today. We also use air as a final rinse to better agitate and loosen the "clumps" of mineral, thereby permitting a much better regeneration of the mineral.

This reverse flow performs four functions: First, the mineral bed becomes recharged with sodium that reacts with the undesired cations by exchanging the ions; second, the bed is physically raised by the reverse flow through it; third, any coarse material filtered out of the water by the treatment bed may be flushed away and fourth, by drawing air and water into the mineral tank, as a final rinse, after it has been saturated by the brine, the mineral is completely loosened from the "clumps" as a series of minor explosions appear to happen within the mineral tank when air/water is drawn into the tank through the injector during the final rinsing of the tank mineral. This causes a much better regeneration and permits additional removal of contaminate than if the air is not used.

The systems that exclusively use a single tank and time/clock do not perform satisfactorily or efficiently in treating water for contaminates. As water use is not the same during a given time period, the mineral bed is either regenerated needlessly (i.e., too soon), causing waste, or the bed will become contaminated before the regeneration time is selected, thus permitting the untreated water to pass through the treatment system without being treated. Also, this system needs to be regenerated when water use is not expected, usually during the wee hours of the morning. When this type of system is regenerated, it automatically goes on "bypass" as it cannot treat the water and regenerated at the same time. If the time clock is not set to the correct time, regeneration can take place during periods of water use at any time of the day.

With our treatment device, we provide a system in which the time of regeneration is immaterial. This is possible because we use two tanks, one of which can be regenerated while the second tank is in operation. Thus, we do not have to be concerned about regeneration at any particular time. We measure the flow of water from the mineral tank through a photo-electric sensor to control the regeneration, based on the gallons of water used: The amount of water that can be passed through a given amount of mineral, based on the contaminate level is commonly known, and by selecting the contaminates of the water and the amount of mineral in the tank, we can select how much water can be safely passed through the mineral before regeneration of the mineral is necessary. This eliminates waste of water and salt for regeneration. It also eliminated the problem of allowing untreated water to flow through the system. By use of various strategically located pressure operated valves, we provide alternate routes of water flow through the tanks so that while one is being regenerated, the second tank is being used. Also, because we have a source of treated water, we can regenerate the spent mineral with contaminate free water, permitting additional gallons of water through the tank after it has been regenerated.

These valves and the circuits they control can best be understood by reference to the following description and figures as follows:

DETAILED DESCRIPTION OF PREFERRED EMBODIMENTS

Figure 1:
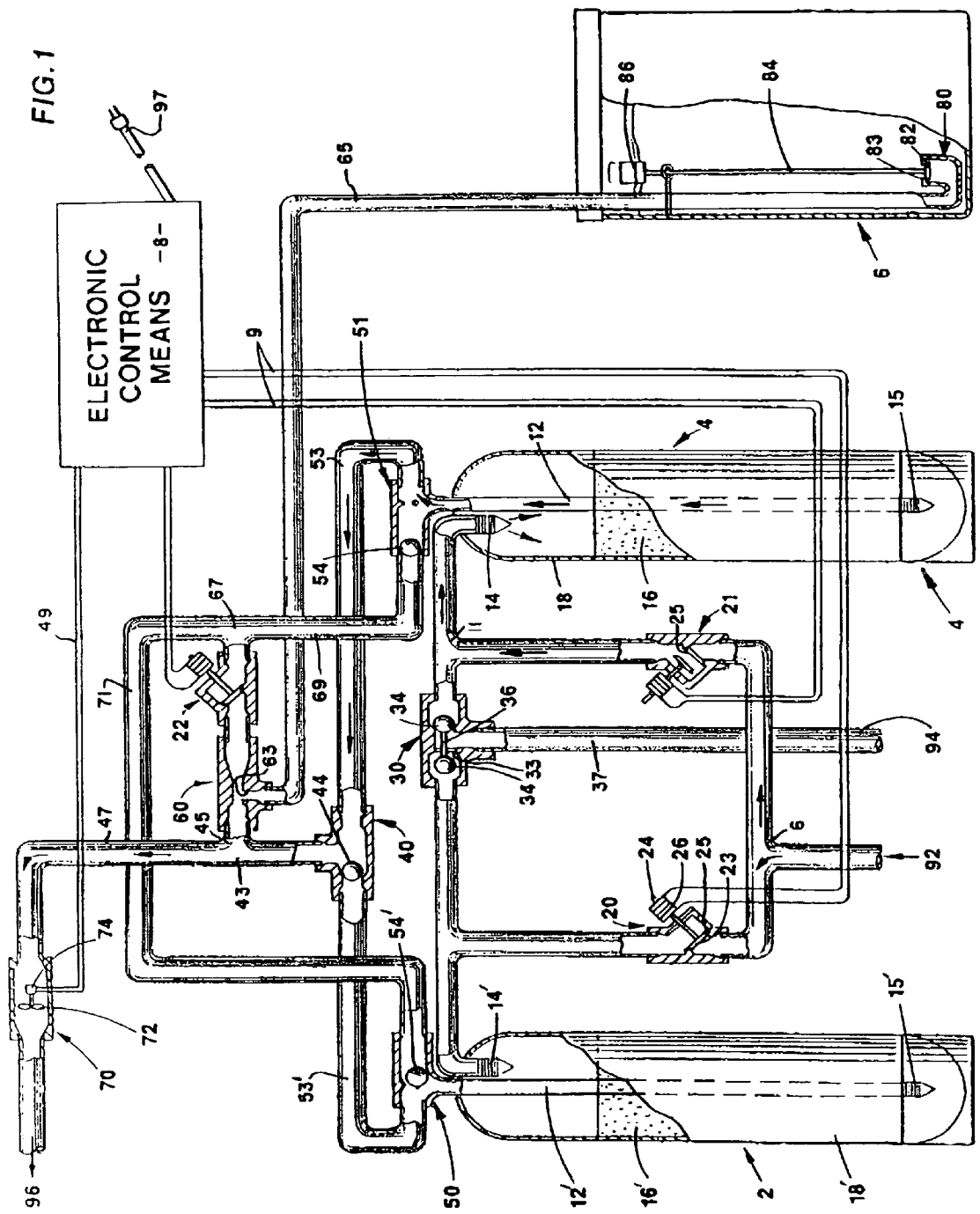
FIG. 1 is a diagram of the system showing the valves and their position while the water flow is through a single treatment tank.
Figure 2:
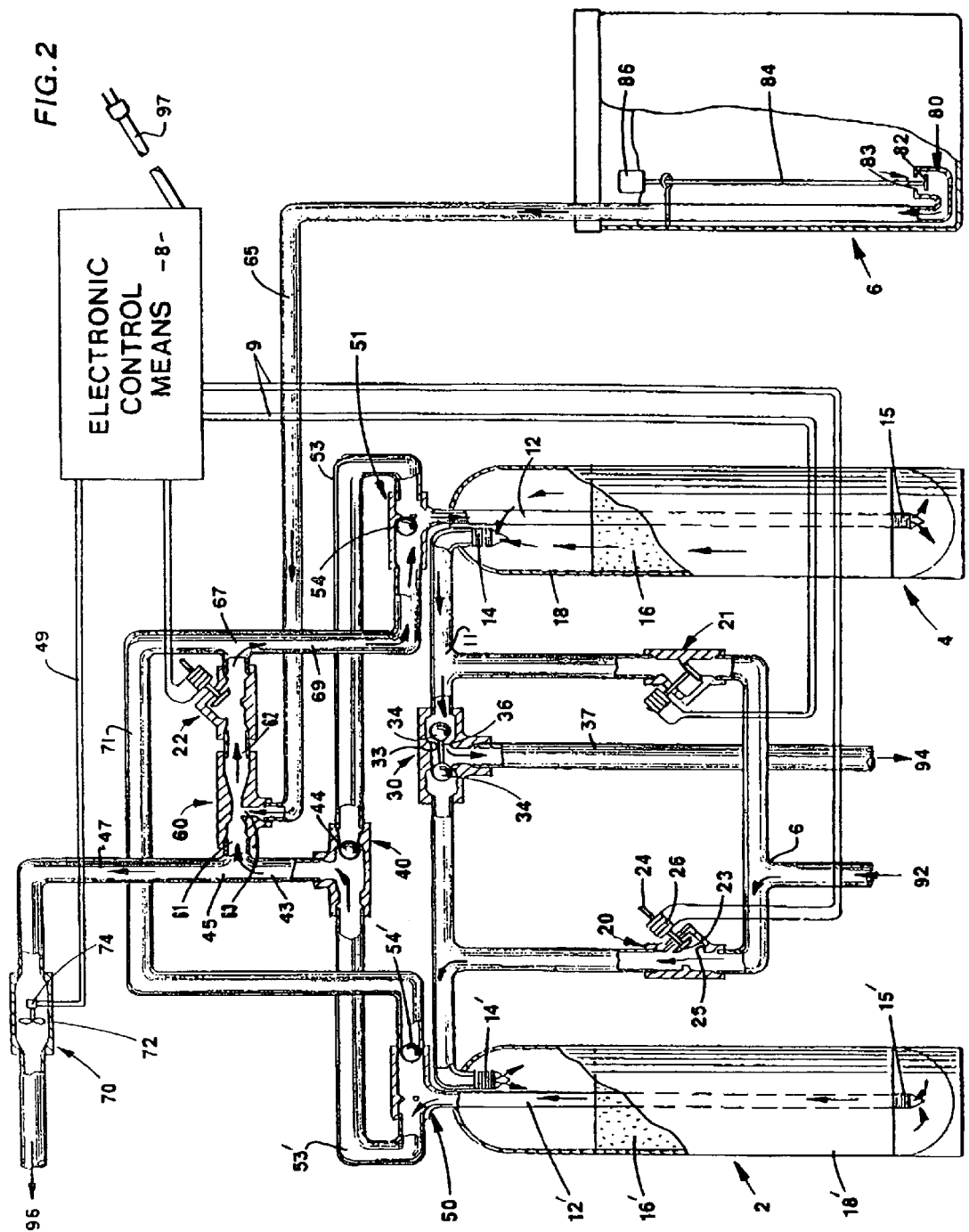
FIG. 2 is a diagram similar to FIG. 1 in which the first treatment tank is being regenerated while the second tank is being used.
Figure 3:
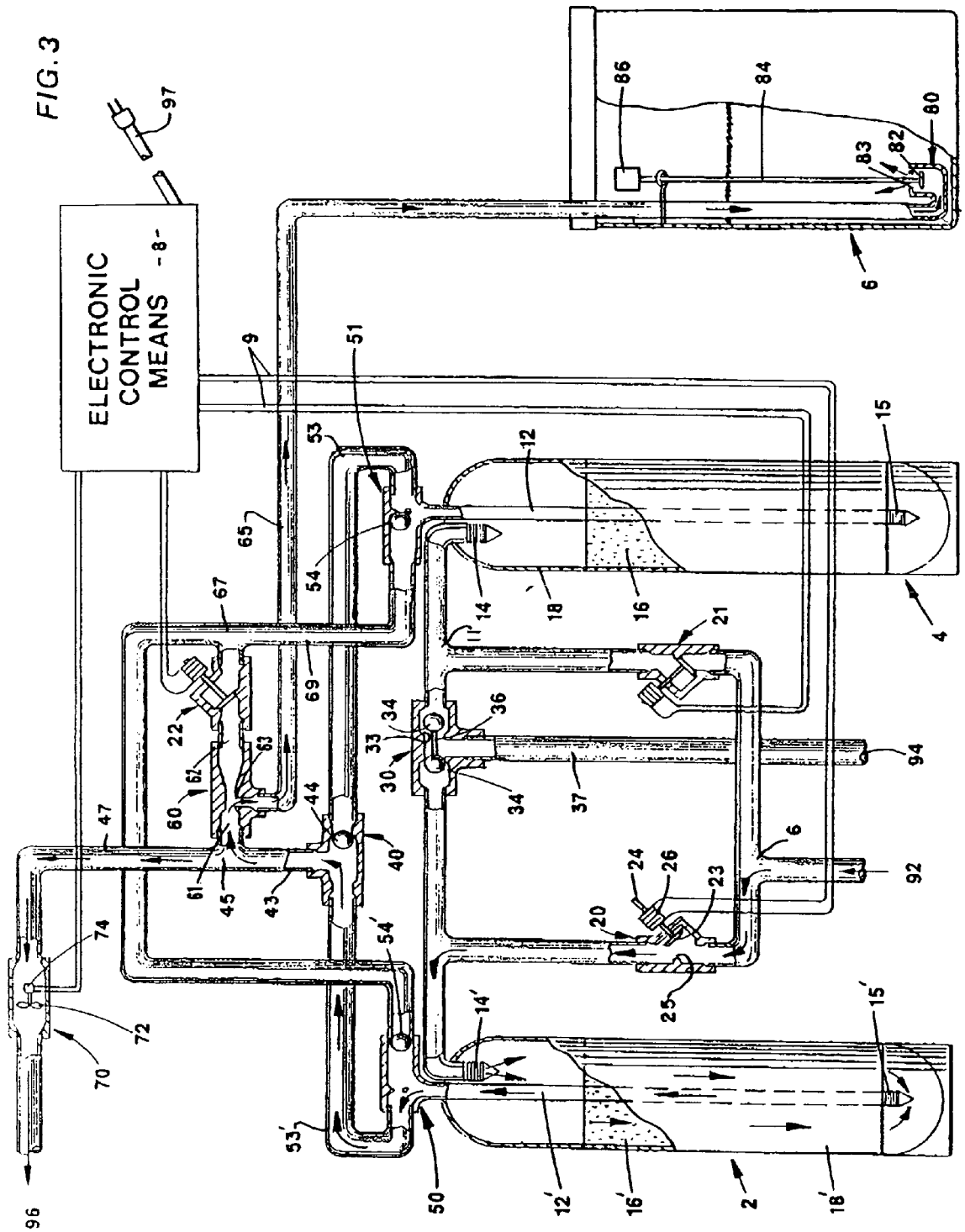
FIG. 3 is a diagram similar to the first two figures in which the second treatment tank is being used and the brine tank is being refilled.

Briefly, our invention comprises a novel system of water treatment of the ion-exchange type in which two tanks are used so that there is never a time when the flow of treated water needs to be interrupted. Recharging is controlled on the basis of the total treated water flow, as measured by a unique flow meter/sensor, and the routing of water through the system is controlled by a minimum number of electrically controlled valves combined with other valves actuated by water pressure.

More specifically and referring to the drawings, we provide a system including a first charging tank (2) and a second charging tank (4) similar to the first. Each of the tanks is adapted to provide filtration of the water and of chemical or anion resins, depending on the need of treatment, i.e.: calcium, nitrates, iron, arsenic, etc. These tanks and their contents may be of a standard type, well known in the art. Each tank is served by piping including a normal entrance pipe terminating in an inlet (14), which includes a screen for initial filtering at a point above the bed (16). A normal exit pipe (12) is also provided with a filtering screen (15) at its open end near the bottom of the bed (16).

The pipe and its arrangement is probably best described by following the flow of water through those pipes. Thus, in FIG. 1, the water in its untreated state enters the system through an inlet (92) and flows to a tee junction (6). The flow from this tee is controlled by a left valve (20) and a right valve (21). These are ordinary solenoid controlled valves including a solenoid (26) in which is slidably disposed a valve stem core (24). A valve head (23) is adapted to seat on a valve seat (25). The valves are identical, and—the power that controls them flows from an electronic control means (8) through wires (9). The control is arranged so that when one valve is open the other is shut. In FIG. 1, the right valve (21) is open, so that the water flows through that valve to a second tee (11).

One branch of the second tee (11) leads to a double check valve (30), This valve is built into a tee shaped body and includes a "push-rod" with check balls at each side of the tee. This "push-rod" holds one side of the valve open, because of the water pressure on the opposite end, which permits the regeneration water to pass through to the drain. Although, we have shown the ends (34) as balls, it will be obvious that they could be other shapes, as long as they seat firmly on valve seats (33) in both legs of the tee. Thus, when one end (34) is seated closing that part of the valve, the other end (34) is open in a position to allow flow from the tee (11) through a pipe (37) to an outlet (94). In FIG. 1, the water is flowing from the right valve (21), thus providing pressure on the right ball (34) pressing it against its seat and opening the other part of the valve. Later descriptions will show how this position may be reversed.

The flow in FIG. 1 from the right valve (21) through the tee (11) and past the valve (30) goes into the top of the tank (4) through the outlet (14). At this point, the water is untreated. However, it now is forced to flow through the mineral bed (16) where it is both filtered and treated in the usual manner of all ion exchange type softeners. When the water flows through the outlet (15) and into the pipe (12), it is treated water.

As the water flows upward through the pipe (12) and into the check valve tee member (51), it exerts pressure on the ball (54), which is the operating part of the check valve. Thus, the ball (54) is moved to the left, in the figure, to close the valve and force the water to flow through the opposite leg of the tee and through the pipe (53) to another check valve tee (40). At this valve, the same action is involved. The water pressure causes the operating member ball 44 to move left to close that part of the valve. This operates in both instances because the valve (20) is closed so that there is no pressure in the left charging tank (2) and therefore no pressure on the left side of the check valves (51) and (40).

The treated water then flows out of the tee 40 through the pipe (43) to another tee intersection (45). The stem of the tee at this point leads through a venturi member (60) to a solenoid valve (22). In the flow pattern in FIG. 1, the valve 22 is closed by action of the control means (8) so that flow in that direction is blocked. The inlet (63) at the throat of the venturi is also closed, through somewhat remotely, by the closed float valve (80) in the brine tank (6). Therefore, the flow is through the tee (45) out through the pipe (47) through the flow sensor (70) and to the distribution system for treated water through the exit pipe (96).

The water sensor (70) is of our unique design, described hereinafter, which includes an impeller (72) and counting mechanism (74). In any case and regardless of the type of flow measurement, the sensor must be such that it will actuate controls in the electronic control means (8) through electrical connections (49). Thus, after a predetermined amount of treated water flows through the flow sensor, the controls are tipped to move the solenoid valves to the position shown in FIG. (2).

As shown in FIG. (2), the valve (21) is closed, blocking flow in that direction. However, the left valve (20) has opened so that water flow is directed into the left tank (2) through entrance (14) and following a route similar to the flow described in connection with FIG. (1) except now, through the opposite tank because pressure is now on the left hand end (34) in the double valve (30), the unit slides to the right to direct flow through the inlet (14). From there, through the bed (16) and the outlet (15) and pipe (12) the flow is similar to that in FIG. (1). At the tee intersection (45), however, the flow is somewhat different Here, the valve (22) has been opened, allowing flow of treated water through the venture (60). This flow through the throat (61) of the venture draws brine from the adjacent brine tank (6) through the pipe (65) to the inlet (63).

The pipe (65) draws brine from the brine tank (6) through a valve (80) near the bottom of the tank (6). The valve includes a disk-like closing member (82) adapted to seat on a valve seat (83) formed to the valve, and a rod (84). Thus when the tank is full, the float (86) pulls the member (82) upward against the seat (83) closing the valve. However, when the venturi starts drawing through the pipe (65) the lifting force of the float (86) is overcome so that brine begins to be drawn down in the tank and then the float drops so that the valve remains open until the tank is emptied or until the valve (22) closes to stop the flow through the venturi (60). Valve (22) is controlled by the electronic sensing device (8) and can be set to remain open for different lengths of time. After the brine is drawn from the brine tank (6), the timer is selected to permit the system to draw air and, here is where one of the advantages lies. As this air enters the mineral tank, the air bubbles cause a much greater lift to the mineral and also the agitation caused by this bubbling, forces the mineral to be completely regenerated by breaking up the clumps and agitating the mineral as it tries to hold together. This permits more treated water to pass through the mineral in each tank than if the air were not used. From the venturi, the mixture of treated water pushed from the tee (45) and the brine from the entrance (63) at the throat of the venturi flows through a tee (67) to a pipe (69) to the ball check valve (51). The opposite leg of the tee (67) connects with a pipe (71) which runs to the left check valve (50). However, this valve will remain closed because of the higher pressure of the water coming from the tank (2). Because the ball (54) is pushed by the mixture from pipe (69) to the open position shown in FIG. (2), the mixture flows down through the pipe (12) and through the bed (16) in a reverse direction from normal. This flow then recharges the bed and at the same time the up flow of the water lifts the mineral so regeneration/ion exchange can take place. This up-flow also removes any deposits on top of the bed to mix with the fluid coming up through the bed. The fluid is then discharged through the entrance (14) through the valve (30) and out of the waste discharge (94). Thus, the process continues for the length of time the valve (22) remains open. This time period for this drawing of brine and then air is controlled from the control means (8) by means well known in the art at the end of the selected time, the tank (4) will be completely recharged and again ready for use. The closing of valve (22) results in the flow shown in FIG. (3) in which the water is being treated in tank (2) in the normal manner. However, because the float valve (80) in the brine tank remains open, flow from the tee (45) through the venturi (60) is diverted back through the entrance (63) through the pipe (65) and into the brine tank. This flow continues until the float (86) rises on the surface of the fluid in the tank (6) closing the valve (80). Closing this valve then leaves the system in condition to treat the water through the left tank (2) in a normal manner until the flow sensor (70) signals the control means (8) to reverse the system. The tank (2) will be recharged and tank (4) will provide normal treatment. Thus, there is never an interruption in the flow treated water through the outlet (96).

The particular flow sensor which we use is of our own design and is illustrated in FIGS. (4-6). As illustrated there, the sensor is adapted to be connected to the pipe (47) by some type of coupling. The figures illustrate threaded fittings (105), but sweated fittings for copper pipe or glued fittings for plastic pipe are also anticipated.

The body of the sensor includes a casing (106) formed by a ring (107) and two caps (108) to enclose the ring. These caps may be fastened to the ring (107) by bolts (109) extending through the body and spaced so as not to impair the flow through the sensor or interrupt the revolutions of the impeller. An axle (110) extends between the caps (108) and an impeller (111) is attached on that axle. The impeller is of the type which will be rotated by the flow of fluid through the body of the device and the speed of which is proportional to the flow. It comprises essentially a single web (113), which is journalled on the axle (110) and includes a series of vanes (114) fixed to the web. By counting the revolutions of the impeller, we can determine the gallons of water and select the prescribed number of gallons of water to pass through the mineral tank before regeneration takes place.

The counting method is relatively simple. We provide a light actuated system including a light source (120) on one side of the body (106) and a receptor (121) opposite the source. These are very small bulblike units as shown. The bulbs for the source (120) and receptor (121) are adapted to fit snugly into openings (123) of the caps (108).

Figure 4:
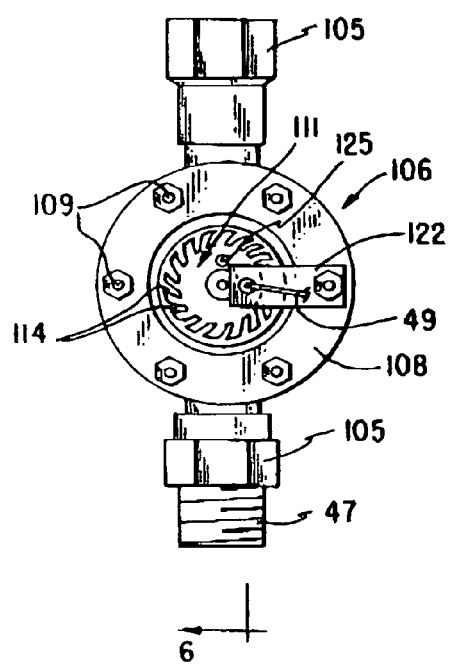
FIG. 4 is a detailed plan view of my novel photo/electric flow sensor device.
Figure 5:
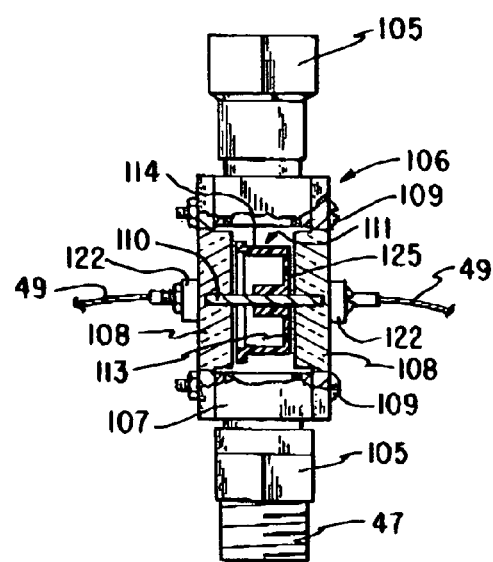
FIG. 5 is a side elevation view of the flow sensor with the operating mechanism down in section.
Figure 6:
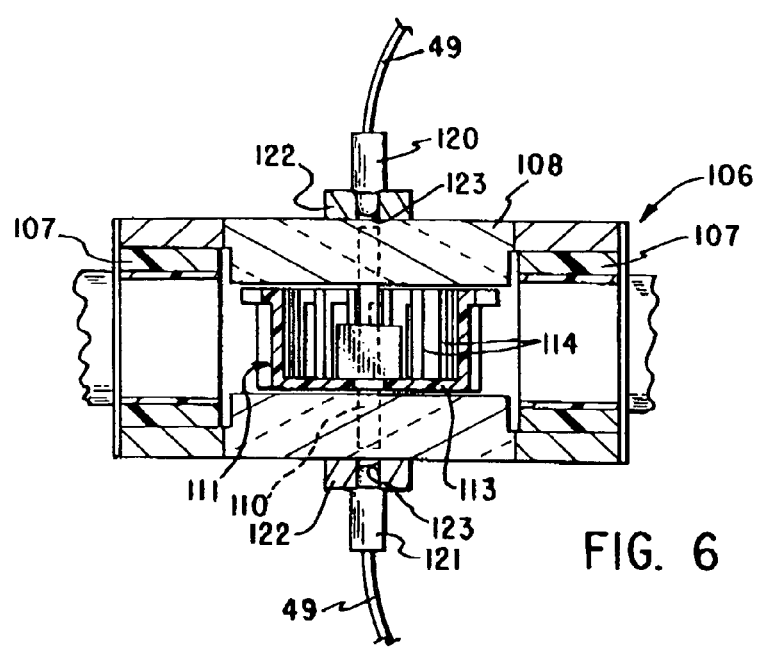
FIG. 6 is an enlarged, detailed sectional view of a part of the flow sensor from line 6-6 of FIG. 4.

We have windows in the caps (108) to allow the light to shine to the receptor (121). Normally, the light from the source (120) is blocked by the web of the impeller (113). However, we provide a hole (125) (FIGS. 4 & 5), which will register with the light beam on each revolution of the impeller. Thus, the receptor will transmit a single impulse responsive to the impulse of light on each revolution, and so, by counting the revolutions, the volume of flow can be measured. The power of the light source (120) and the impulses transmitted by the receptor (121) are respectively transmitted and received through wires (49) connected to the control means (8).

Therefore in our system we can use the flow sensor to determine automatically when the controls should be reversed to recharge the spent tank. The amount of flow will be inversely proportional in some function to the hardness of the water. However, this flow can be calculated and tabulated so that the user of the system can know how much flow is proper before recharging. That amount of flow can be programmed or set into the controls so that when the rotor has turned the predetermined number of times as counted by the control, then the switches (20, 21 & 22) can be actuated first to cause the flow to be switched from one tank to the other and to recharge the first tank, then to run treated water into the brine tank to refill that tank.

All of the controls required in the "control means" are well within the ability of one skilled in the ark being simply a counter and some switching and timed switching controls. Power to the controls and to the valves is made available by connecting a wire (97) to an outside power source.

Although the present invention has been described with a certain degree of particularity, it is understood that the disclosure has been made by way of example, and changes in detail or structure may be made without departing from the spirit of the invention as defined in the appended claims. For example, we have described and illustrated a system such as might be used by a homeowner. It will be apparent that a similar system might be used commercially and in municipalities. These systems will require larger tanks, valves and pipes and additional treatment media beds, depending on the amount of water flow required in the particular installation.

We claim:

1. An ion exchange system for treatment of water to remove minerals therefrom, comprising:
   two water treatment tanks;
   a brine tank;
   a network of pipes interconnecting said treatment tanks and connecting said treatment tanks to said brine tank;
   a plurality of valves in said network of pipes whereby flow of water through said pipes is directed and controlled;
   control means connected to a least some of said valves, said connected valves being controlled in response to said control means;
   an inlet connected to said network whereby untreated hard water is piped into the system;
   an outlet on said network whereby treated soft water is directed out of the system;
   a flow measuring mechanism in said pipes to measure the flow of treated water, said flow-measuring mechanism being connected to said control means whereby the treatment tanks are used alternately depending on a predetermined flow of treated water through said measuring mechanism; and
   a float valve within said brine tank to control flow of brine and air from said brine tank and treated water into said brine tank.

2. The system of claim 1 wherein the measuring mechanism includes a photo sensor.

3. The system of claim 1 further comprising a venturi in said network of pipes actuated by water flowing through said venturi into one of said treatment tanks, said venturi having an inlet at a throat of said venturi through which brine and air from the brine tank are drawn into said venturi.

4. The system of claim 1 in which said valves connected to said control means include at least two valves between said inlet and said treatment tanks, said two valves being controlled so that only one will be open at any instant of time.

5. The system of claim 4 in which said valves controlled by the control means also include a third valve, said network of pipes including pipes from said treatment tanks joined together at a tee intersection, said tee intersection including two legs, each of said legs being connected to one of said tanks and a stem emptying into a pipe extending to said flow measuring mechanism, branch pipe means from said pipe extending to said flow measuring mechanism, a venturi in said branch pipe means, said venturi having a throat and an opening formed in said throat, said opening including pipe means extending to said brine tank whereby brine and air may be withdrawn from said brine tank into said throat, said third valve being connected to said venturi to control the flow through said venturi.

6. The system of claim 5 in which said inlet is divided into two branches as it enters the system, each of said two valves being disposed in and adapted to control one of said two branches, each of said two branches being again divided between said valves and said inlets into an inlet branch leading to said treatment tank and an outlet branch, said outlet branches being joined together as two legs of a tee intersection, a dual check valve mechanism is provided to close one of said outlet branches while opening the other, said dual check valve mechanism being responsive to water pressure in said outlet branches, the stem of said last named tee intersection being connected to said outlet.

7. An ion exchange water treatment method, comprising;
providing a flow of water for treatment to remove minerals from untreated water;
causing said untreated water to flow alternately through first and second treatment tanks and then through an outlet;
measuring the amount of flow of said water through said outlet;
opening and closing valves in response to passage of a predetermined amount of water through the outlet, thereby switching said untreated water to flow alternatingly between the first and second treatment tanks and then through said outlet;
simultaneously with said switching of flow, opening a valve to cause treated water to be mixed with a brine draw followed by air from a brine tank;
causing said mixing brine, air, and treated water to backflow through said first treatment tank to recharge said tank for a fixed time period; at expiration of said time period;
diverting some of said treated water to said brine tank to refill said brine tank to a certain level; and
upon reaching that level, stopping said flow of water into said brine tank.

8. The method of claim 7 which includes a constant alternation of said steps between said first treatment tank and second treatment tank, using a photo sensor device to control the flow of water through each tank.

9. An ion exchange system for removing minerals from water, comprising:
first and second treatment tanks for receiving untreated hard water and discharging treated soft water;
pipes interconnecting the treatment tanks;
valves in the pipes to control flow of untreated water through the treatment tanks;
a sensor to measure the flow of treated water;
controls for opening and closing the valves to direct untreated water alternatingly to the first and second treatment tanks after a predetermined volume of treated water is sensed by the sensor;
the sensor comprising:
an impeller disposed within flowing liquid, said impeller being rotated at a speed proportional to the flow rate of said flowing liquid;
a light emitter;
a light receiver for receiving and sensing light from said light emitter;
structure on said impeller between said emitter and receiver for alternatingly allowing and blocking light as said impeller rotates; and
means for sensing a rate at which said light is allowed and blocked at said light receiver.

10. The system of claim 9 further comprising a brine tank; the pipes interconnecting the brine tank to the treatment tanks; the valves in the pipes directing flow of water between the brine tank and the treatment tanks such that the tanks are alternatingly regenerated.

11. The system of claim 10 further comprising a venture in the pipes to actuate a brine draw from the brine tank to the treatment tanks.

12. The system of claim 9 wherein the sensor is a photoelectric device.

13. An ion exchange system for treatment of water to remove minerals therefrom, comprising:
two water treatment tanks;
a brine tank;
a network of pipes interconnecting said treatment tanks and connecting said treatment tanks to said brine tank;
a plurality of valves in said network of pipes whereby flow of water through said pipes is directed and controlled;
control means connected to a least some of said valves, said connected valves being controlled in response to said control means;
an inlet connected to said network whereby untreated hard water is piped into the system;
an outlet on said network whereby treated soft water is directed out of the system;
a flow measuring mechanism in said pipes to measure the flow of treated water, said flow-measuring mechanism being connected to said control means whereby the treatment tanks are used alternately depending on a predetermined flow of treated water through said measuring mechanism;
said valves connected to said control means including at least two valves between said inlet and said treatment tanks, said two valves being controlled so that only one will be open at any instant of time; and
said valves controlled by the control means also include a third valve, said network of pipes including pipes from said treatment tanks joined together at a tee intersection, said tee intersection including two legs, each of said legs being connected to one of said tanks and a stem emptying into a pipe extending to said flow measuring mechanism, branch pipe means from said pipe extending to said flow measuring mechanism, a venturi in said branch pipe means, said venturi having a throat and an opening formed in said throat, said opening including pipe means extending to said brine tank whereby brine and air may be withdrawn from said brine tank into said throat, said third valve being connected to said venturi to control the flow through said venturi.

14. An ion exchange system for treatment of water to remove minerals therefrom, comprising:
two water treatment tanks;
a brine tank;
a network of pipes interconnecting said treatment tanks and connecting said treatment tanks to said brine tank;
a plurality of valves in said network of pipes whereby flow of water through said pipes is directed and controlled;
control means connected to a least some of said valves, said connected valves being controlled in response to said control means;
an inlet connected to said network whereby untreated hard water is piped into the system;
an outlet on said network whereby treated soft water is directed out of the system;
a flow measuring mechanism in said pipes to measure the flow of treated water, said flow-measuring mechanism being connected to said control means whereby the treatment tanks are used alternately depending on a predetermined flow of treated water through said measuring mechanism; and
the measuring mechanism including:
an impeller disposed within flowing liquid, said impeller being rotated at a speed proportional to the flow rate of said flowing liquid;
a light emitter;
a light receiver for receiving and sensing light from said light emitter; structure on said impeller between said emitter and receiver for alternatingly allowing and blocking light as said impeller rotates; and
means for sensing a rate at which said light is allowed and blocked at said light receiver.

* * * * *